United States Patent [19]

Grossmann et al.

[11] Patent Number: 5,237,735
[45] Date of Patent: Aug. 24, 1993

[54] METHOD FOR SECURING A SCREW MEANS IN A PRESET POSITION

[75] Inventors: Hans-Michael Grossmann, Herzogenaurach; Hans-Peter Harnisch, Cadolzburg; Wolfgang Saatmann, Rosstal, all of Fed. Rep. of Germany

[73] Assignee: Robert Bosch GmbH, Stuttgart, Fed. Rep. of Germany

[21] Appl. No.: 910,375

[22] Filed: Jul. 8, 1992

[30] Foreign Application Priority Data

Jul. 8, 1991 [DE] Fed. Rep. of Germany ....... 4122528

[51] Int. Cl.[5] .............................................. B21D 39/00
[52] U.S. Cl. ................................ 29/522.1; 29/525.1;
29/527.1; 156/272.2; 156/293; 264/322
[58] Field of Search .................... 29/451, 522.1, 525.1,
29/527.1, 530; 264/249, 322; 156/91, 309.6,
272.2, 275.5, 293; 411/377, 169, 512

[56] References Cited

U.S. PATENT DOCUMENTS

| 3,134,290 | 5/1964 | Jentoft | 411/377 |
| 3,781,986 | 1/1974 | Joslyn et al. | 264/249 X |
| 4,865,687 | 9/1989 | Pierson | 156/293 X |
| 4,975,006 | 12/1990 | Swanson | 29/522.1 X |
| 4,979,281 | 12/1990 | Smith et al. | 29/525.1 |
| 5,018,329 | 5/1991 | Hasan et al. | 411/377 X |
| 5,121,537 | 6/1992 | Matsui et al. | 29/522.1 |

FOREIGN PATENT DOCUMENTS

| 1880511 | 10/1963 | Fed. Rep. of Germany . | |
| 7834756 | 4/1980 | Fed. Rep. of Germany . | |
| 8125414 | 1/1981 | Fed. Rep. of Germany | 411/377 |
| 409532 | 10/1966 | Switzerland . | |
| 1408532 | 10/1975 | United Kingdom | 411/377 |

OTHER PUBLICATIONS

Dubbel, Taschenbuch für den Maschinenbau, 16 Aufl., p E55.
Herausgegeben W. Beitz and U.-H. perdoc. Küttner.
Machine Design—The Fasteners Book, 29.9. 1960 pp. 186-201.

*Primary Examiner*—Timothy V. Eley
*Assistant Examiner*—C. Richard Martin
*Attorney, Agent, or Firm*—Edwin E. Greigg; Ronald E. Greigg

[57] ABSTRACT

The invention relates to a method for producing and securing a screw in a preset position to prevent unauthorized adjustment. The screw securing means according to the invention makes it possible to secure a screw connection in a simple manner, in that a screw head of thermoplastic plastic, which is at least partly located in a housing recess, is heated to such an extent that it changes to the liquid state, flows into the housing recess, and at least partially fills the housing recess. By form-fitting engagement with the threaded pin and the housing recess, security against twisting, and also against being rotated without authorization, is attained. Screws in components that vibrate severely, and adjusting screws that must not be adjusted by unauthorized third parties, can be secured with this screw securing means.

6 Claims, 1 Drawing Sheet

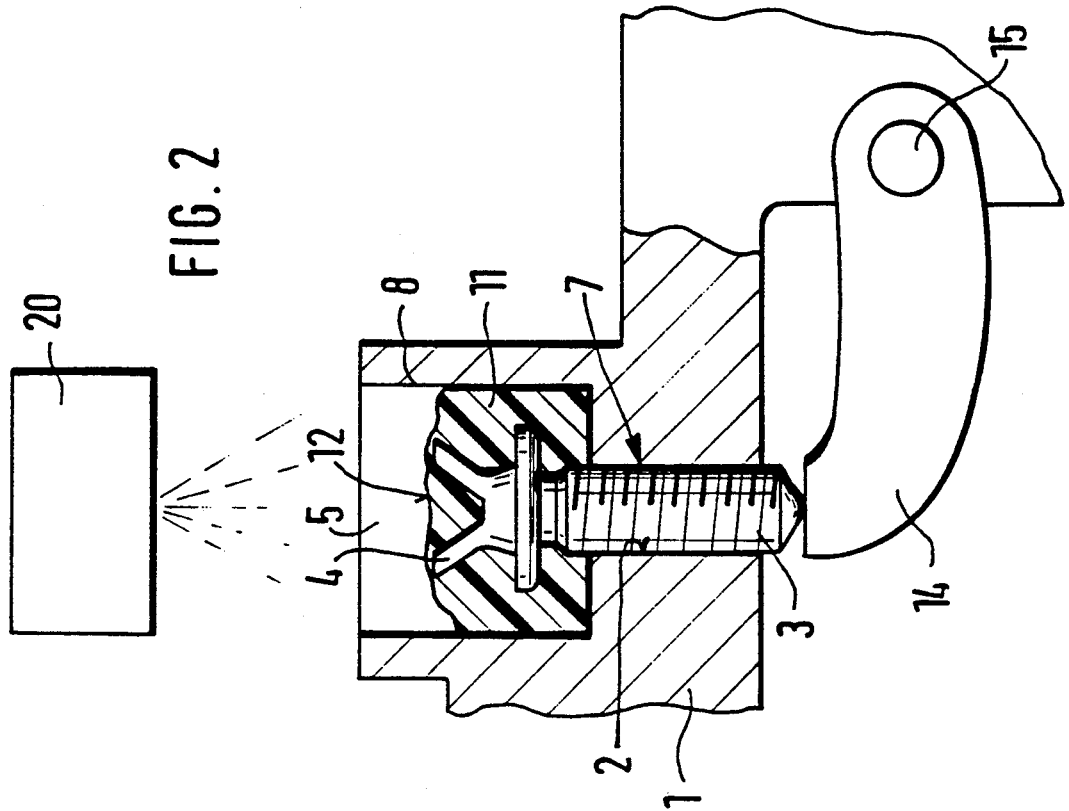
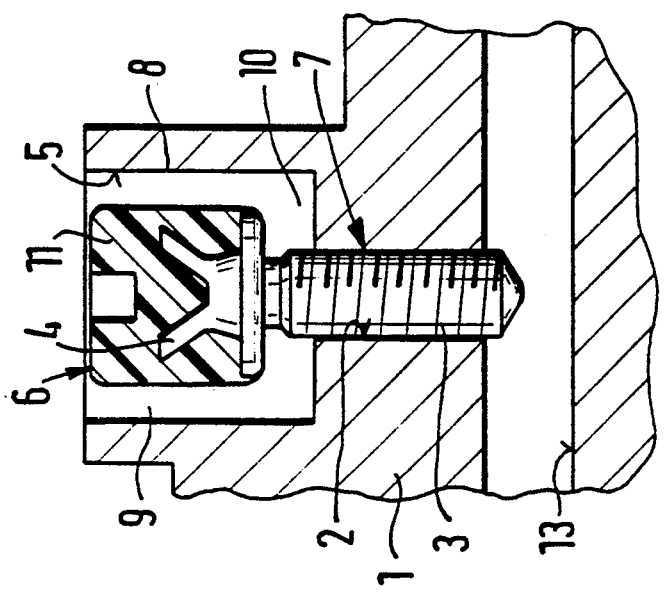

METHOD FOR SECURING A SCREW MEANS IN A PRESET POSITION

BACKGROUND OF THE INVENTION

The invention is based on a method for securing a screw in a preset position. Screw connections must be secured if impacts and jarring can loosen them, or if unauthorized use by third parties is to be prevented.

The known securing means effect positive engagement by force, for example by means of spring rings or spring shims, or by a form-fitting shape, for example by means of linch pins or tongued safety plates. The additional components required increase both costs and the effort of assembly. Moreover, security against unauthorized use is not possible with the methods listed above, because the screw connection can be loosened and tightened again without the use being made evident by some visible external change that can be seen when it is checked, for instance.

OBJECT AND SUMMARY OF THE INVENTION

The screw securing means according to the invention has an advantage over the prior art that the effort and expense for locking or securing a screw connection can be reduced considerably in a simple manner, since the screw securing means of the invention makes do without additional components, such as spring rings, that serve the sole purpose of security. The production cost of the screw connection according to the invention is lowered, first because the components used for security are omitted, and second because the effort of assembly is accordingly less.

In the invention, securing the screw connection against unauthorized use is also possible. The screw connection according to the invention can be loosened only if some part of the screw is irreversibly destroyed first. The destroyed part cannot be replaced by unauthorized third parties, and so the screw connection can no longer be returned to its pre-intervention condition. The changes in the screw caused by the intervention are readily seen when checks are made, and so third parties are prevented from making unauthorized interventions.

It is especially advantageous if the heat required to melt the screw head is produced by ultrasound or by a lamp that radiates light in the infrared range.

The invention will be better understood and further objects and advantages thereof will become more apparent from the ensuing detailed description of a preferred embodiment taken in conjunction with the drawings.

BRIEF DESCRIPTION OF THE DRAWINGS

FIG. 1 shows a screw in a screw housing, and
FIG. 2 shows the screw after the method according to the invention is employed.

DESCRIPTION OF THE PREFERRED EMBODIMENT

Securing means for screws are required wherever the screws are exposed to major dynamic loads, in the form of impacts and jarring, or whenever unauthorized use by third parties is to be prevented. This is especially necessary with fuel-metering devices in internal combustion engines, because adjusting the screws can damage the engine or change its emissions performance, with negative effects for the environment.

FIG. 1 of the drawing shows a housing 1 with a threaded bore 2 located in it. A threaded pin 3 is screwed into the threaded bore 2; on its upper end, it has a zig-zag-like structure 4, and it protrudes into a recess 5 of the housing 1 that adjoins the threaded bore 2. A screw head 6 of thermoplastic plastic is extruded around the zig-zag-like structure 4; it is at least partially surrounded, in a radially spaced-apart manner, from the recess 5 of the housing 1. The threaded pin 3, the zig-zag-like structure 4 and the screw head 6 form a screw 7. Once the screw 7, screwed into the threaded bore 2, has been adjusted, an annular gap 9 is created between the screw head 6 and a surface 8 of the recess 5. An annular gap 10 is created between the threaded pin 3 and the surface 8 of the recess 5.

The screw head 6, which comprises the plastic composition 11, is then heated to its melting temperature. To this end, some energy source 20, such as a lamp that produces light in the infrared range, or an ultrasonic transmitter, is aimed at the screw head 6. The liquid plastic flows into the annular gaps 9 and 10 and at least partially fills them. Once the plastic composition 11 has set, i.e. hardened, in the recess 5, the recess has an irregular surface 12, as FIG. 2 shows. Because of its irregular shape, the surface 12 offers no opportunity for access to manipulate the position of the threaded pin. Because of the form-fitting connection of the hardened plastic composition 11 with the threaded pin 3 on the one hand and the wall 8 of the recess 5 on the other, security against turning of the threaded pin is attained. Manipulation of the threaded pin 3 is possible only after at least partial removal of destruction of the plastic composition 11 and can thus le readily detected when checks are made. Effective security against unauthorized use is thus provided.

This kind of screw securing means can serve for instance to adjust an idling air conduit 13 in an engine intake tube, or can serve as a stop for an articulation lever 14 of a throttle valve, disposed on a shaft 15 in an intake tube, or, in a manner not shown, it may serve as an adjuster or stop limiter for some other device.

The foregoing relates to a preferred exemplary embodiment of the invention, it being understood that other variants and embodiments thereof are possible within the spirit and scope of the invention, the latter being defined by the appended claims.

What is claimed and desired to be secured by Letter Patent of the United States is:

1. A method for securing a screw means in a housing for preventing unauthorized adjustment after securing the screw means in a preset position in a threaded bore in the housing which comprises forming a screw means with a head and a threaded end, forming a thermoplastic about the head, positioning the screw means in the threaded bore and a recessed opening in said housing for receiving the head and the thermoplastic with a spacing about the head and the thermoplastic, adjusting the screw means to a preset position in the threaded bore, applying a heat source to said thermoplastic head to produce a molten plastic flow which flows into the spacing about said head, and permitting the molten plastic to harden thereby locking said screw head in said recessed opening.

2. The method as defined by claim 1, which comprises forming said head of said screw means in a zig-zag shape before application of the thermoplastic.

3. A method as defined by claim 2, in which the heat source is infrared radiation.

4. A method as defined by claim 2, in which said heat source is ultrasound.

5. A method as defined by claim 1, in which the heat source is infrared radiation.

6. A method as defined by claim 1, in which said heat source is ultrasound.

* * * * *